(12) United States Patent
Betz et al.

(10) Patent No.: US 6,601,925 B1
(45) Date of Patent: Aug. 5, 2003

(54) METHOD FOR RETARDER CONTROL AND CONTROL APPARATUS FOR THE SAME

(75) Inventors: Jürgen Betz, Satteldorf (DE); Roland Scherer, Crailsheim (DE); Klaus Vogelsang, Crailsheim (DE)

(73) Assignee: Voith Turbo GmbH & Co. KG (DE)

( * ) Notice: Subject to any disclaimer, the term of this patent is extended or adjusted under 35 U.S.C. 154(b) by 0 days.

(21) Appl. No.: 09/830,133
(22) PCT Filed: Sep. 29, 1999
(86) PCT No.: PCT/EP99/07220
§ 371 (c)(1),
(2), (4) Date: Jun. 19, 2001
(87) PCT Pub. No.: WO00/24621
PCT Pub. Date: May 4, 2000

(30) Foreign Application Priority Data

Oct. 22, 1998 (DE) ............................ 198 48 546

(51) Int. Cl.$^7$ ................................................ B60T 15/34
(52) U.S. Cl. ................................. 303/57; 303/155
(58) Field of Search .................. 303/3, 155, 167, 303/57, DIG. 1, 59, 64, 67

(56) References Cited

U.S. PATENT DOCUMENTS

| 5,333,707 A | * | 8/1994 | Kaneda ................... 188/290 |
| 5,393,130 A | * | 2/1995 | Graham ................... 303/13 |
| 6,065,817 A | * | 5/2000 | Menke et al. ............. 188/294 |
| 6,247,765 B1 | * | 6/2001 | Oyama .................. 137/625.65 |

FOREIGN PATENT DOCUMENTS

| DE | 4113539 | 10/1991 |
| DE | 29707304 | 8/1998 |
| EP | 0873925 | 10/1998 |

* cited by examiner

Primary Examiner—Christopher P. Schwartz
Assistant Examiner—Xuan Lan Nguyen
(74) Attorney, Agent, or Firm—Ostrolenk, Faber, Gerb & Soffen, LLP

(57) ABSTRACT

A method for filing a retarder with an operating fluid through a valve connected to a fluid reservoir having air pressure $P_v$ and conveying an operating fluid with an actuating pressure $P_y$ in the retarder. The method comprises: after starting the retarder during a first time interval $T_1$, an overshoot actuating pressure $P_y(U)$ lying above nominal pressure $P_y$NENN for the nominal braking torque to be regulated is adjusted. In a second time interval $T_2$, overshoot actuating pressure $P_y(U)$ is reduced to a nominal pressure $P_y$NENN. The overshoot actuating pressure $P_y(U)$ and timer intervals $T_1$ and $T_2$ are determined or regulated depending on at least one of the following parameters: reservoir air pressure $P_v$, retarder oil temperature, retarder or vehicle speed, vehicle acceleration, vehicle transversal acceleration, ABS signal, axle load, brake-pause interval, operating fluid level, outside temperature, speed of the actuating element, acceleration with respect to nominal value settings (speed variation without nominal value dynamics).

12 Claims, 1 Drawing Sheet

METHOD FOR RETARDER CONTROL AND CONTROL APPARATUS FOR THE SAME

BACKGROUND OF THE INVENTION

The invention relates to a method for filling a retarder with an operating fluid by means of valve devices which are connected to a reservoir vessel with a reservoir air pressure $P_v$, and which feed an operating fluid with a control pressure $P_y$ into the retarder, in which case, after the retarder is switched on for a first time period $T_1$, an overshoot control pressure $P_y(O)$ which lies above the rated pressure $P_y$RATED for the rated braking torque which is to be set is set and, in a second time period $T_2$, the overshoot control pressure $P_y(O)$ is reduced to the rated pressure $P_y$RATED.

In addition to the method, the invention also specifies a control device for carrying out the method.

The braking torque of a hydrodynamic retarder is generally configured in such a way that, at the request of, for example, the driver of a vehicle, the working chamber is filled with working fluid or operating fluid, preferably oil or water.

In order to minimize the switch-on time of such a hydrodynamic retarder, it is necessary to fill the working chamber between the rotor and stator with the operating fluid rapidly, that is to say to feed the operating fluid out of a reservoir chamber into the working chamber at a high speed. This is usually carried out using a compressed air valve device whose output pressure $P_y$, which corresponds to the control pressure of the retarder, feeds the operating fluid into the working chamber.

In order to ensure rapid switching on, it is known to override the setpoint control pressure or rated control pressure which is predefined by the desired rated braking torque. This means that for a short time period a higher pressure than the rated pressure is exerted on the operating fluid. It has become apparent that under certain operating conditions such actuation leads to the braking effect occurring only after a delay or, in an extreme case, causes the antilock brake system of the vehicle to be triggered.

A control device as described above for a retarder is known, for example, from DE-A-41 13 539.

The control device for a retarder according to DE-A-41 13 539 comprises a collecting tank, which has a fluidic connection to the retarder, and a pressure-setting component, which can have an atmospheric connection to the collecting tank, in order to impose a predetermined limitation on the compressed air flowing into the collecting tank, in accordance with the respective specified pressure level which is generated in the retarder.

SUMMARY OF THE INVENTION

The object of the invention is to overcome the above-mentioned disadvantages of the prior art.

This object is achieved in that the overshoot control pressure $P_y(O)$ and the time period, which is divided into the time periods $T_1$ and $T_2$, are specified or set as a function of at least one of the following variables:

retarder oil temperature
retarder rotational speed or vehicle velocity
vehicle lateral acceleration
ABS signal
axle load
brake-pause interval
brake fluid level
outside temperature
speed of the actuating element
acceleration of the setpoint value settings (variation in speed without setpoint value dynamics).

It has become apparent that it is particularly preferred if the level $P_y(O)$ and time periods $T_1$ and $T_2$ of the overshoot control pressure decrease as the retarder oil temperature rises.

In a developed embodiment of the invention, the retarder rotational speed is taken into account in that the level $P_y(O)$ and time periods $T_1$ and $T_2$ of the overshoot pressure decrease as the retarder rotational speed and/or vehicle velocity increase.

The preceding brake requests, for example the time period of the brake/pause intervals or the retarder braking level and the retarder braking level actuation velocity can also influence the configuration of the retarder braking torque. A further variable which influences the switch-on behavior of the retarder is the operating fluid level, i.e. the level of working fluid, for example that of the oil in the reservoir vessel. The time period for which the overriding is carried out and the level are predefined as a function of the operating fluid level which can be determined by means of sensors, the level $P_y(O)$ and the time period $T_1$ and $T_2$ increasing as the operating fluid level decreases. It is therefore advantageous if these a variables are also taken into account in determining the configuration of the overshoot pulse.

In the previously described method, the invention also makes available a retarder control unit for carrying out the method; said retarder control unit comprising an arithmetic unit, a control pressure-setting device and sensor devices for sensing at least one of the following variables:

the retarder oil temperature,
the retarder rotational speed,
the vehicle lateral acceleration,
the ABS signal and
the axle load
brake-pause interval
brake fluid level
the outside temperature
the speed of the actuating element
the acceleration of the setpoint value settings (variation in speed without setpoint value dynamics), and the retarder control unit is defined in that the arithmetic unit actuates the control pressure-setting device as a function of the sensed signals, in such a way that an overshoot control pressure of a predetermined level or value is set for a predetermined time period.

BRIEF DESCRIPTION OF THE DRAWING

The invention is described below by way of example with reference to the figure.

DESCRIPTION OF A PREFERRED EMBODIMENT OF THE INVENTION

Figure 1:
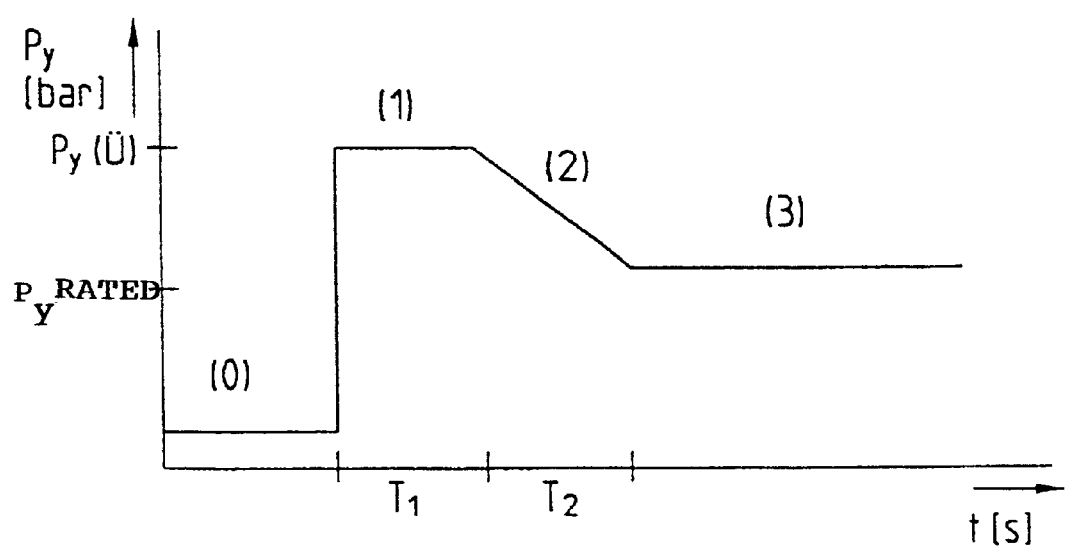
FIG. 1 shows by way of example the profile of the control pressure $P_y$ according to the principle as a function of time.

FIG. 1 shows the variation over time of the control pressure $P_y$ as a function F(t). The control pressure is increased rapidly from value 0 to the value $P_y(O)$ when switching on occurs. The overshoot control pressure $P_y(O)$ is applied for the time period $T_1$. In the following time $T_2$, the overshoot control pressure $P_y(O)$ is reduced to the rated pressure $P_y$RATED. The rated pressure $P_y$RATED is the pressure at which the retarder reaches its rated torque. In the present case, the reduction of the overshoot control pressure $P_y(O)$ to the rated pressure $P_y$RATED is linear. However, this is not at all compulsory. Of course, the person skilled in the art may also select other types of continuous reduction here.

The switch-on behavior of the retarder is then determined decisively by the level of the overriding of the rated pressure, which can reach a maximum of the reservoir pressure of the reservoir air vessel, and the time period for which the overriding takes place, and the time period during which the pressure is reduced from the overriding pressure to the rated pressure. In order to optimize the switch-on behavior, these variables are predefined as a function of vehicle state signals, for example the reservoir pressure, the temperature of the operating fluid or else also the retarder rotational speed. The priorities for determining the variation in time of the control pressure are particularly preferably determined using an arithmetic unit or an electronic control unit, and specifically as a function of, for example, the physical variables determined using sensors, as stated above.

The reservoir pressure $P_v$ of the vehicle, which can be determined using a separate pressure sensor, will be given here only by way of example for the variables influencing the variation of the pressure over time. In this way it is possible to compensate operationally conditioned pressure fluctuations and different vehicle reservoir rated pressures and always achieve the same retarder braking behavior irrespective thereof.

By providing a temperature sensor for the operating fluid it is possible to take into account fluctuations in viscosity of the operating fluid which are due to a change in temperature. It is generally the case that the switch-on behavior becomes worse the greater the viscosity of the operating fluid. This can be counteracted if both the level or value of the overshooting, and the time period for which the overshooting is carried out, increase when the retarder oil temperature decreases.

In addition to the variables sensed by means of the sensor, other information which can be obtained from the vehicle management system can be used to calculate the variation in pressure over time. The retarder rotational speed which can be derived from the tachograph signal is mentioned here only by way of example, only small overshoot pressure profiles being necessary at a high velocity, and at a high retarder rotational speed, in contrast to low retarder rotational speeds which require high overshoot pressure profiles for rapid switching on.

The present invention thus provides a method and a device with which it is possible to achieve essentially identical retarder switch-on behavior irrespective of the vehicle operating conditions.

What is claimed is:

1. A method for filling a hydrodynamic retarder having a rotor, a stator, and a working chamber disposed between the rotor and the stator, wherein the working chamber is filled from a reservoir that feeds to a valve into the retarder and the reservoir is pressurizable with an air pressure $P_v$ for feeding operating fluid into the retarder at a control pressure $P_y$, the method comprising:

switching the retarder on; during passage of a first time period $T_1$, delivering an overshoot control pressure $P_y(O)$ which is above a rated pressure $P_y$Rated established in the retarder for a rated braking torque which is to be set;

during a second time period following the first time period, reducing the overshoot control pressure $P_y(O)$ to the rated pressure $P_y$Rated;

setting the overshoot control pressure and the duration of the time periods $T_1$ and $T_2$ as a function of at least one of the following variables for insuring rapid switching on the retarder with reduced delay of the braking effect, the variables being at least one selected from the group consisting of: reservoir air pressure $P_y$, retarder oil temperature, retarder rotational speed or vehicle velocity, vehicle lateral acceleration, ABS signal, axle load, brake-pause interval, operating fluid level, outside temperature, speed of the actuating element, acceleration of the set point value settings;

wherein as the variable of the retarder oil temperature rises, the variables of the overshoot control pressure and the time periods are decreased.

2. The method of claim 1, wherein as the retarder rotational speed or the vehicle velocity increase, the variables of the overshoot control pressure and the first and second time periods are decreased.

3. The method of claim 1, wherein as the retarder rotational speed or the vehicle velocity increase, the variables of the overshoot control pressure and the first and second time periods are decreased.

4. The method of claim 2, wherein the variables of the overshoot control pressure and of the first and second time periods are additionally determined by preceding braking requests on the retarder.

5. The method of claim 1, wherein the variables of the overshoot control pressure and of the first and second time periods are additionally determined by preceding braking requests on the retarder.

6. The method of claim 2, wherein as the variable of the brake-pause interval increases, the variables of the overshoot control pressure and of the first and second time periods increase.

7. The method of claim 1, wherein as the variable of the brake-pause interval increases, the variables of the overshoot control pressure and of the first and second time periods increase.

8. The method of claim 6, wherein as the braking level of the retarder increases, the variables of the overshoot control pressure and of the first and second time periods of the overshoot pressure increase.

9. The method of claim 4, wherein as the braking level of the retarder increases, the variables of the overshoot control pressure and of the first and second time periods of the overshoot pressure increase.

10. The method of claim 2, wherein as the variable of the axial load increases, the variables of the overshoot control pressure and of the first and second time periods increase.

11. The method of claim 1, where as the variable of the axial load increases, the variables of the overshoot control pressure and of the first and second time periods increase.

12. The method of claim 10, wherein as the variable of the operating fluid level in the reservoir vessel of the retarder decreases, the variables of the overshoot pressure control and of the first and second time intervals increase.

\* \* \* \* \*